United States Patent
Bernard

(10) Patent No.: US 7,479,231 B2
(45) Date of Patent: Jan. 20, 2009

(54) METHOD AND APPARATUS FOR SEPARATING FLUIDS HAVING DIFFERENT DENSITIES

(76) Inventor: Robert H. Bernard, P.O. Box 16062, Tucson, AZ (US) 85732

(*) Notice: Subject to any disclaimer, the term of this patent is extended or adjusted under 35 U.S.C. 154(b) by 626 days.

(21) Appl. No.: 11/122,931

(22) Filed: May 4, 2005

(65) Prior Publication Data
US 2005/0189293 A1    Sep. 1, 2005

(51) Int. Cl.
*B01D 17/038* (2006.01)
*B01D 24/38* (2006.01)

(52) U.S. Cl. .............. 210/744; 210/788; 210/800; 210/115; 210/512.1; 210/519; 210/533

(58) Field of Classification Search .......... 210/744, 210/788, 800, 114, 512.1, 519, 533, 115
See application file for complete search history.

(56) References Cited

U.S. PATENT DOCUMENTS

| | | |
|---|---|---|
| 2,180,811 A | 11/1939 | King |
| 3,656,619 A | 4/1972 | Ryan et al. |
| 3,743,095 A | 7/1973 | Mensing et al. |
| 3,800,951 A | 4/1974 | Mourlon et al. |
| 4,111,809 A | 9/1978 | Pichon |
| 4,391,708 A | 7/1983 | Le Foll et al. |
| 4,726,686 A | 2/1988 | Wolf et al. |
| 4,855,066 A | 8/1989 | Petty et al. |
| 4,857,197 A | 8/1989 | Young et al. |
| 4,997,549 A | 3/1991 | Atwood |
| 6,767,459 B1 | 7/2004 | Sinker et al. |

FOREIGN PATENT DOCUMENTS

JP     358104686 A     6/1983

*Primary Examiner*—David A Reifsnyder
(74) *Attorney, Agent, or Firm*—Portland Intellectual Property, LLC

(57) ABSTRACT

A method and apparatus for separating mixtures of fluids having different densities. According to one aspect of the invention, a lower density fluid is separated from a higher density fluid. A mixture of the two fluids is received in a tank. A centrifugation of the mixture is induced in the tank. The lower density fluid is evacuated from the tank until the level of an interface created at least in part by the centrifugation between the higher density fluid and the lower density fluid reaches a predetermined threshold.

15 Claims, 3 Drawing Sheets

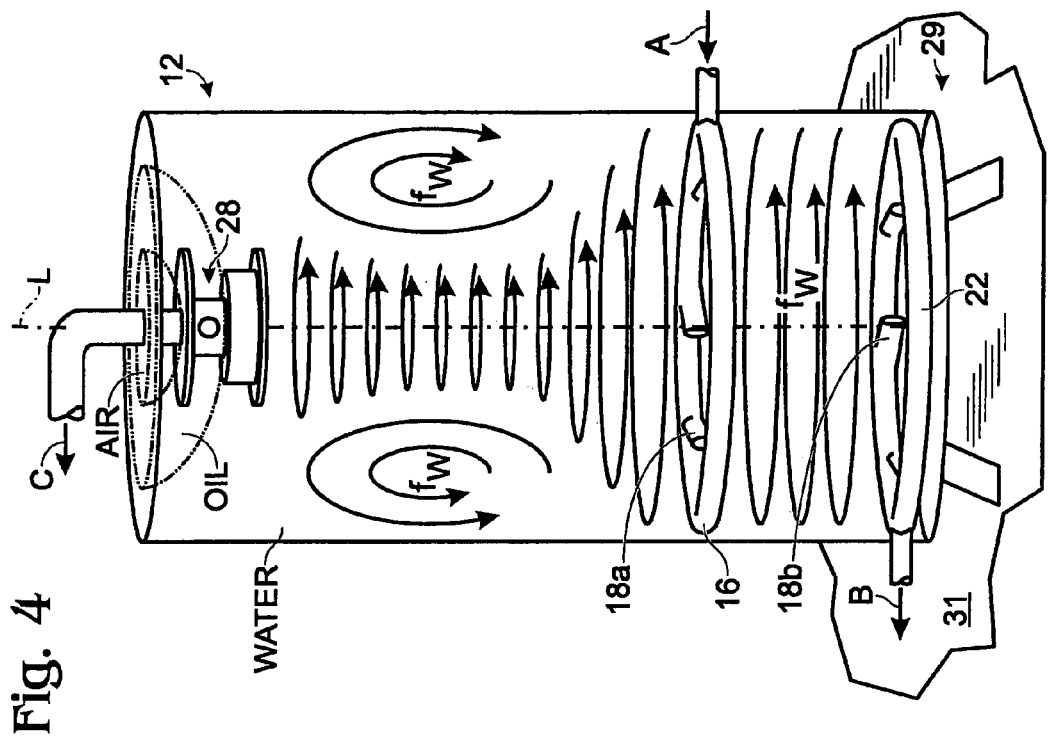
Fig. 4
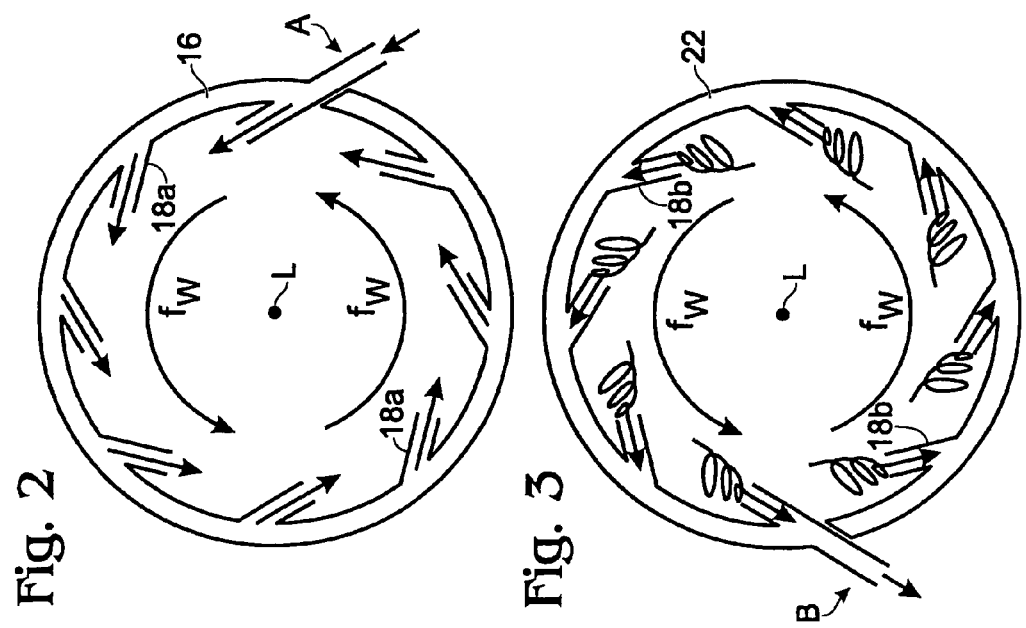
Fig. 2
Fig. 3

METHOD AND APPARATUS FOR SEPARATING FLUIDS HAVING DIFFERENT DENSITIES

FIELD OF THE INVENTION

The present invention relates to a method and apparatus for separating mixtures of fluids having different densities or specific gravities, such as mixtures of oil and water.

BACKGROUND

There is often a need to separate or retrieve fluids out of fluid mixtures. An important example is cleaning water contaminated by an oil spill. Typically, the fluids have different densities, and so it is common to separate the fluids by centrifugation.

In a centrifugal separator, the mixture is caused to swirl in a tank, referred to herein as "vortex flow." The heavier, higher density fluid is thrust outwardly against the sides of the tank with a greater force than the lighter, lower density fluid. The higher density fluid thereby accumulates at the periphery of the tank, while the lower density fluid accumulates at the center of the tank.

U.S. Pat. No. 3,743,095 provides a number of design considerations for centrifugal separators. The disclosed separator is oriented horizontally. Both the water outlet and the oil outlet are centrally located on the cylindrical axis, one outlet at one end of the tank and the other outlet at the other end of the tank. It is important to maintain the oil within a narrow central region of the tank by closely controlling the flow rate of the separated oil output from the device to ensure that it is equal to the flow rate of incoming oil in the oil/water mixture input to the device. This is due to the means used to ensure that water leaving the tank is not contaminated by the separated oil. Particularly, to prevent oil from re-mixing with the outgoing water, a blocking disc is provided immediately in front of the water outlet, the blocking disc having a diameter that is less than the diameter of the water outlet but greater than or equal to the diameter of the cylindrical region in which the separated oil is contained.

As it is difficult to ensure that the flow rates of oil entering and leaving the tank are always equal, especially since the amount of oil entering the tank is not easily measured, the reference proposes recirculating the separated water back through the separator to improve separation. The criticality of controlling the flow of oil removed from the separator, and the requirement, to improve separation, to repeat the separation process by recirculating the separated water back through the separator, are distinct disadvantages of the system.

U.S. Pat. No. 2,180,811 proposes a centrifugal separator that is oriented vertically to take advantage of the force of gravity in providing vertical settling of the separated fluids. A lower outlet is provided at the bottom of the tank for removing the higher density fluid and an upper outlet is provided at the top of the tank for removing the lower density fluid. A valve is provided in the path of the outflow of higher density fluid from the lower outlet. The valve automatically opens to allow removal of the higher density fluid as the interface between the higher density fluid and the lower density fluid rises above a threshold; otherwise, the valve remains closed to ensure that the level of the higher density fluid will not fall below the prescribed threshold.

The '811 patent fails to explain why this control is believed to be advantageous. In any event, the valve cannot ensure that higher density fluid will not back up into the outlet provided for removing the lower density fluid. This could be a problem in situations where the lower density fluid must be stored. For example, when cleaning an oil spill in the open sea, the water may simply be pumped back into the sea but the oil must be stored on-board the ship where storage space and capacity is at a premium. The valve mechanism of the '811 patent is also undesirably complex.

Therefore, as the present inventor has recognized, there is a need for a method and apparatus for separating mixtures of fluids having different densities that provides for more simple, efficient, and effective separation than has been provided in the prior art.

SUMMARY

A method and apparatus for separating mixtures of fluids having different densities is disclosed. According to one aspect of the invention, a lower density fluid is separated from a higher density fluid. A mixture of the two fluids is received in a tank. A centrifugation of the mixture is induced in the tank. The lower density fluid is evacuated from the tank until the level of an interface created at least in part by the centrifugation between the higher density fluid and the lower density fluid reaches a predetermined threshold.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWING

FIG. 2 is a plan view, looking down an axis "L" shown in FIG. 1, of an inlet plenum according to the present invention and flow lines created thereby.

FIG. 3 is a plan view, looking down the axis "L" as in FIG. 2, of an outlet plenum according to the present invention.

FIG. 4 is a schematic side elevation of the tank of FIG. 1 showing flows for an oil and water mixture.

DETAILED DESCRIPTION OF PREFERRED EMBODIMENTS

Figure 1:
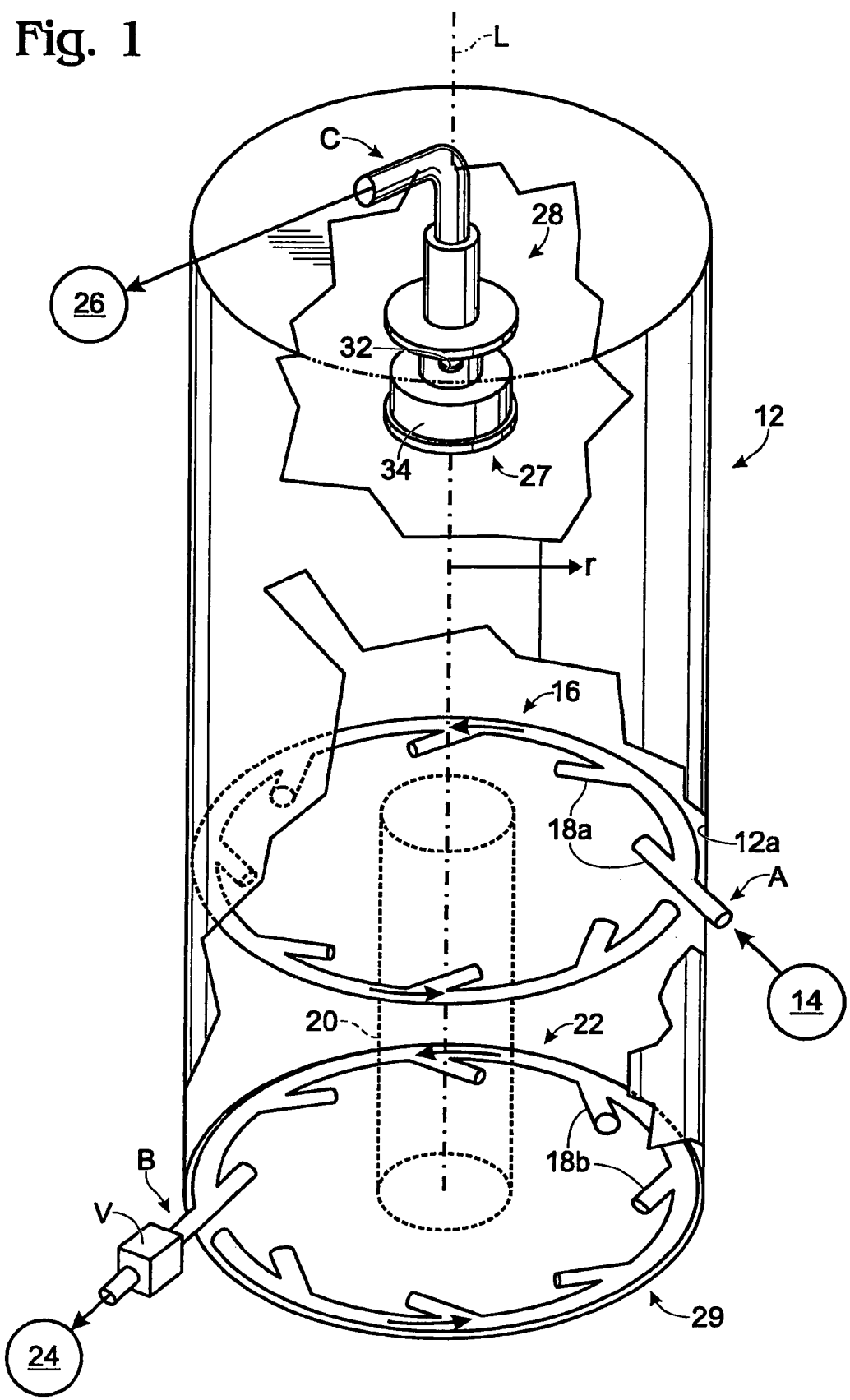
FIG. 1 is a pictorial schematic view of an apparatus for separating fluids having different densities according to the present invention.

FIG. 1 illustrates an apparatus 10 for separating fluids having different densities according to the present invention. A preferred use of the apparatus 10 is to separate liquid fluids, but the principles of operation of the apparatus may be applied to gaseous fluids as well, and fluids containing solid particles, and the apparatus may be used for separating such fluids for any purpose. However, the apparatus 10 is particularly adapted for separating oil and water, and therefore finds particular use in cleaning water into which oil has been spilled.

A tank 12 is provided in which a fluid mixture 14 is introduced through a mixture inlet "A." The inlet "A" receives the mixture from an external source (not shown), such as a pump.

A vortex flow of the fluid mixture introduced into the tank is created as described below about a central axis "L" of the tank. Accordingly, the tank is radially symmetric about the axis "L," such as by being cylindrical as shown. While a cylindrical form of the tank 12 is believed to be preferable, it should be understood that other radially symmetric shapes conducive to the creation and maintenance of a vortex flow may be employed, including that shown in the aforementioned '811 patent. In any case, the vortex flow produces centrifugation of the mixture 14.

An inlet plenum 16 is provided in communication with the inlet "A." Referring in addition to FIG. 2 (looking down the axis "L") the inlet plenum includes a plurality of nozzles 18a that are tangentially disposed with respect to the cylindrical inner wall 12a of the tank 12. The nozzles direct the mixture tangentially against the inner wall 12a, thereby imparting a circular or swirling movement of the mixture in the tank (flow lines "$f_w$" in FIG. 2.)

Centrifugation occurs because the circular movement of the mixture produces a radially outwardly directed acceleration (e.g., vector "r") therein, pressing the mixture against the inner wall 12a. Denser and therefore more massive elements of the fluid will experience a greater such force than lighter elements. Thence, the denser elements will crowd out the lighter elements in the vicinity of the inner wall 12a, forcing the lighter elements to accumulate in a central region 20 of the tank nearest the axis "L."

It may be noted that the manner in which the fluids are acted upon by centrifugal force depends on whether the fluids are miscible. Where two fluids are immiscible, such as water and oil, the molecules of each tend to adhere together. The force acting on the fluids as a result of centrifugation acts on the fluids in their aggregate states. Water is denser in its aggregate state than oil, and is therefore the higher density fluid for purposes of centrifugation. On the other hand, where two fluids are miscible, such as water and alcohol, the force acting on the fluids as a result of centrifugation acts on the individual molecules of the fluids as though they were particles.

The present inventor has recognized that it is desirable to orient the nozzles 18a such that a counterclockwise vortex is created in the tank 12 operated in the northern hemisphere, or alternatively so that a clockwise vortex is created for use in the southern hemisphere, to take advantage of the Coriolis force that results from rotation of the earth. This is not essential, however.

An outlet "B" is provided at a lower elevation in the tank than that of the inlet "A" for exhausting the tank of higher density fluid 24. With additional reference to FIG. 3 (looking down the axis "L" in the same direction as in FIG. 2), to further facilitate the creation of a vortex flow, an outlet plenum 22 is provided in communication with the outlet "B" that is a substantially mirror image of the inlet plenum 16, having nozzles 18b oriented opposite to the orientation of the nozzles 18a of the inlet plenum. This assists to maintain the vortex induced by the inlet plenum (flow lines "$f_w$" in FIG. 3). Experimentally, it has been determined that the flow into the nozzles 18b appears substantially as shown in FIG. 3.

With additional reference to FIG. 4, the tank includes a bottom portion or stand 29 adapted to stand the tank in a stable position on a horizontal surface. In this stable position, the axis "L" of the tank 12 is oriented vertically to permit the influence of gravity to facilitate separation. Particularly, in addition to being induced by centrifugation to accumulate in the central region 20 of the tank, the lower density fluid also tends to rise toward an outlet "C" for exhausting the lower density fluid from the tank as a result of being displaced by higher density fluid sinking to the bottom.

A valve 28 is provided according to the invention for controlling outflow of the lower density fluid, to ensure that only the lower density fluid and not the higher density fluid flows through the outlet "C." Operation of the valve 28 is described below.

To ensure that fluid reaches the level of the valve 28, a pressure relief valve "V" may be provided in the path of outflow from the outlet "B." The pressure relief valve is pre-set to open when enough fluid has accumulated in the tank to reach the level of the valve 28. Alternatively, this function could be accomplished by controlling the rate of inflow at "A" relative to the rate of outflow at "B."

Experimentally, the present inventor has determined that a fluid mixture of oil and water introduced into the tank 12 through the inlet "A" appears substantially as shown in FIG. 4 (flow lines "$f_w$"), with the water (referenced as "water") exhibiting a vortex pattern represented by flows in the direction of the arrows and the oil (referenced as "oil") accumulating at the top of the tank in a concave-curved band. At the very top of the tank 12, proximate the central axis "L," a pocket of air (referenced as "air") assumes the shape shown. The air is compressible, and its presence permits adjustment of the pressure at which the valve "V" opens.

The valve 28 controlling outflow at "C" is preferably a hollow tube 30 having a closed end 27 and a through-going inlet hole 32 in a side-wall of the tube. Fluid can therefore enter the outlet "C" only through the hole 32. However, it will be readily appreciated by persons of ordinary mechanical skill that the valve 28 could be constructed in many different ways to achieve the same result.

Coaxially and slidably disposed on the tube is a plug 34. The plug is adapted to cover or uncover the inlet hole 32 in response to changes in the level of fluid. Particularly, the plug has a density that is less than the density of the higher density fluid and greater than the density of the lower density fluid. Accordingly, the plug will float on the higher density fluid but will sink in the lower density fluid.

By opening only in the presence of low density fluid, the valve 28 provides that the fluid retrieved from the outlet "C" is substantially pure lower density fluid, uncontaminated with higher density fluid. Among the advantages provided by the valve 28, the fluid retrieved from the outlet "C" can be stored in as compact a space as is possible.

Figure 5A:
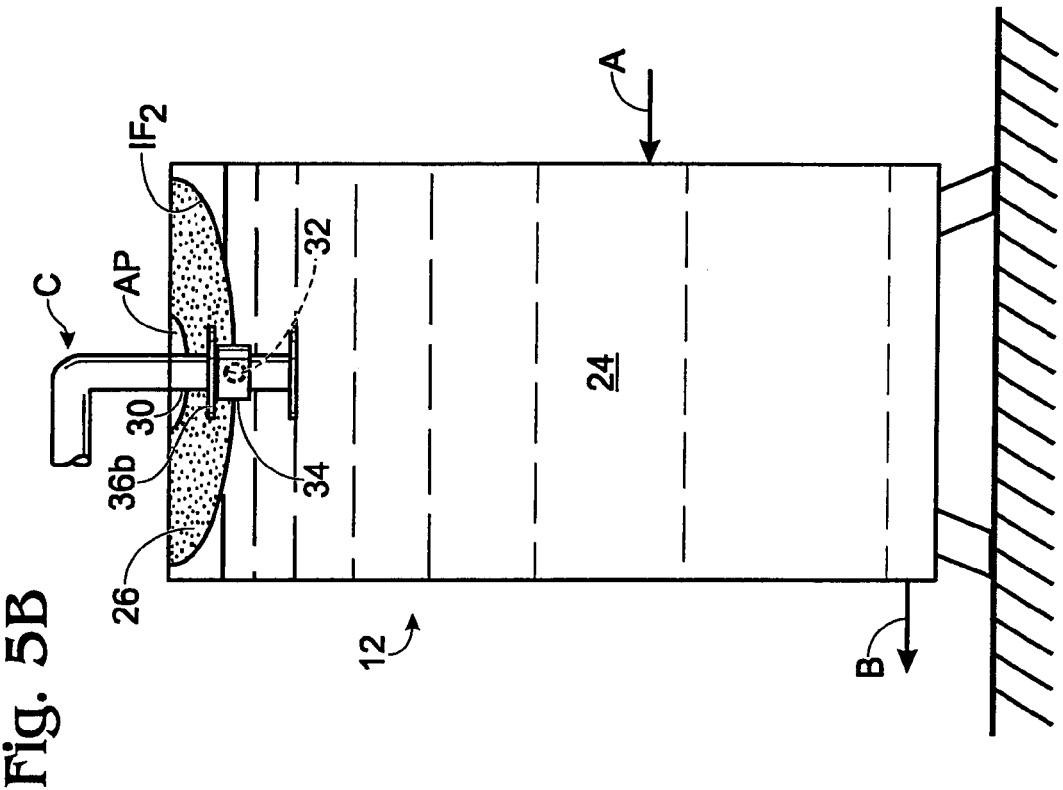
FIG. 5A is a schematic side elevation of the tank of FIG. 1 showing a valve for removing lower density fluid according to the invention in an open configuration.

FIG. 5A shows in simplified form the tank 12 with an interface $IF_1$ between a high density fluid 24 and a low density fluid 26, along with an air pocket "AP" at the top of the tank. The valve 28 is in an open configuration in which the valve passes a flow "f" through the hole 32 and the outlet "C." The plug sinks in the lower density fluid 26 toward the interface "$IF_1$." Therefore, the interface "$IF_1$" lies below a level at which the plug 34 will cover the inlet hole 32 and block the flow. Stops 36a are provided on the tube 30 to keep the plug 34 from falling off the tube 30.

Figure 5B:
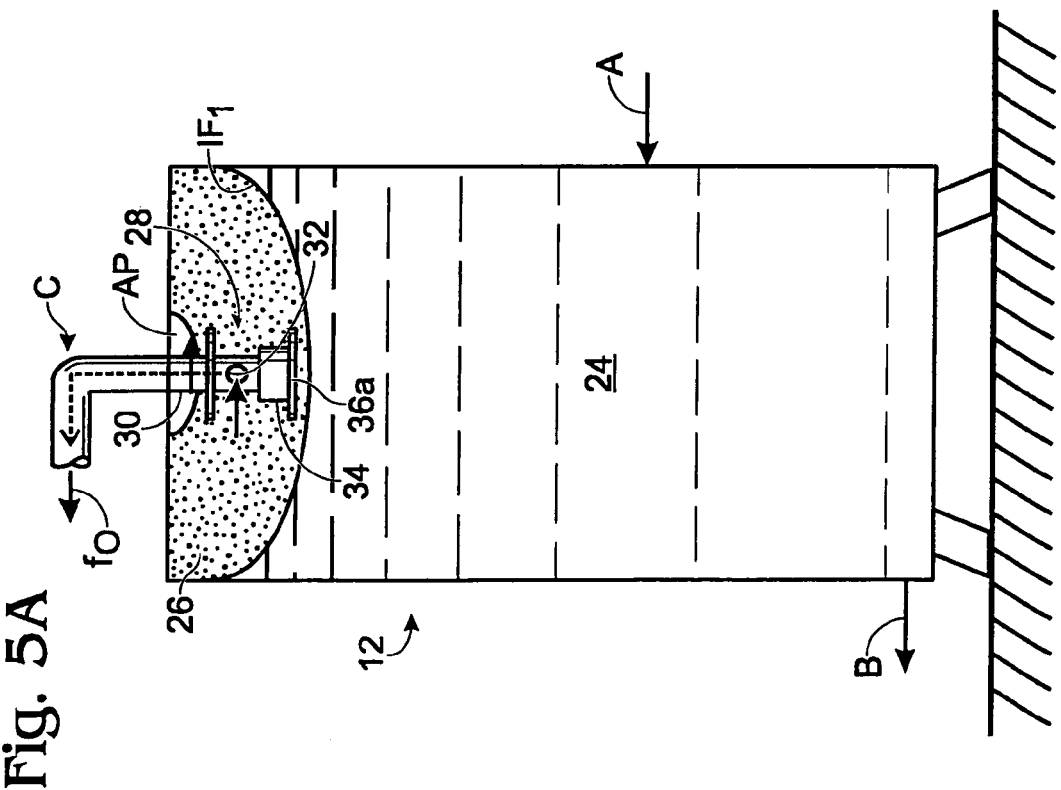
FIG. 5B is a schematic side elevation of the tank of FIG. 1 showing the valve of FIG. 5A in a closed configuration.

Referring to FIG. 5B, the valve 28 is shown in a closed configuration. A new interface "$IF_2$" lies at the higher elevation of the hole, so that higher density fluid could flow into the inlet hole 32, except that, as the plug 34 also floats at this level it moves with the interface to close off the hole 32. Accordingly, for the interface level at "$IF_j$," flow through the outlet "C" cannot occur, which prevents higher density fluid from escaping the tank through the outlet provided for the evacuation of the lower density fluid. Stops 36b are provided on the tube 30 to ensure that, should the level of the interface $IF_2$ rise above the level shown, the plug 34 will not rise above the level of the inlet hole 32.

It may be noted that the interface level at which the valve 28 becomes closed can be adjusted by adjusting the length of the tube 30 and the elevation of the inlet hole 32.

It is to be understood that, while a specific method and apparatus for separating fluids having different densities has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An apparatus for separating a lower density fluid from a higher density fluid, comprising:
   a tank having an inlet for receiving therein a mixture of the two fluids and a first outlet for evacuating the lower density fluid, said inlet adapted to induce centrifugation of said mixture in said tank; and
   a valve responsive to the level of an interface created at least in part by said centrifugation between the higher density fluid and the lower density fluid within said tank, said valve being disposed in the line of fluid flow through said outlet and adapted to close when said interface reaches a predetermined level and remain closed so long as said interface remains at or above said level.

2. The apparatus of claim 1, wherein said tank is adapted to produce said centrifugation around an axis, said tank being adapted to stand stably on a surface so that said axis is oriented substantially vertically, the level of said interface being created by both said centrifugation and the force of gravity.

3. The apparatus of claim 1, wherein said inlet includes a first plenum including a plurality of first nozzles for directing said mixture against internal sides of said tank to produce centrifugation.

4. The apparatus of claim 3, wherein said nozzles are directed to produce counterclockwise centrifugation.

5. The apparatus of claim 3, wherein said tank further includes a second outlet for evacuating the higher density fluid, said second outlet including a second plenum including a plurality of second nozzles configured in substantially mirror image to said first nozzles.

6. The apparatus of claim 5, wherein said tank is adapted to produce said centrifugation around an axis, said tank being adapted to stand stably on a substantially horizontal surface so that said axis is oriented substantially vertically.

7. The apparatus of claim 6, adapted so that the elevation of said second outlet is below the elevation of said inlet when said tank is standing on said surface, and wherein said centrifugation is about said axis.

8. The apparatus of claim 7, wherein said nozzles are directed to produce counterclockwise centrifugation.

9. The apparatus of claim 8, wherein said tank is substantially cylindrical.

10. The apparatus of claim 6, wherein said tank is substantially cylindrical.

11. The apparatus of claim 1, wherein said tank is substantially cylindrical.

12. A method for separating a lower density fluid from a higher density fluid, comprising:
    receiving a mixture of the two fluids in a tank;
    inducing a centrifugation of said mixture in the tank;
    evacuating, from the tank, the lower density fluid until the level of an interface created at least in part by said centrifugation between the higher density fluid and the lower density fluid reaches a predetermined level; and
    preventing evacuation, from the tank, of the lower density fluid so long as the lower density fluid remains at or above said level.

13. The method of claim 12, wherein said step of inducing causes said centrifugation to occur about a substantially vertical axis.

14. The method of claim 13, wherein said step of inducing causes said centrifugation to occur in the counterclockwise direction.

15. The method of claim 12, wherein said step of inducing causes said centrifugation to occur in the counterclockwise direction.

* * * * *